US006654224B2

United States Patent
Libera

(10) Patent No.: US 6,654,224 B2
(45) Date of Patent: Nov. 25, 2003

(54) DEGAUSSING CIRCUIT

(75) Inventor: John P. Libera, Fallbrook, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/051,487

(22) Filed: Jan. 18, 2002

(65) Prior Publication Data

US 2003/0137793 A1 Jul. 24, 2003

(51) Int. Cl.[7] .............................................. H01H 47/00
(52) U.S. Cl. ......................................... 361/143; 315/8
(58) Field of Search ................................ 361/150, 267, 361/143, 144; 315/8

(56) References Cited

U.S. PATENT DOCUMENTS

| 3,965,386 | A | * | 6/1976 | Duistermaat et al. | ........... | 315/8 |
| 4,626,981 | A | * | 12/1986 | Su et al. | ........................ | 363/62 |
| 4,760,489 | A | * | 7/1988 | Truskalo | ..................... | 361/150 |
| 6,037,716 | A | * | 3/2000 | Shikama et al. | ................ | 315/8 |

FOREIGN PATENT DOCUMENTS

KR        2002013039 A    *  2/2002    ............ H04N/9/29

* cited by examiner

Primary Examiner—Brian Sircus
Assistant Examiner—Boris Benenson
(74) Attorney, Agent, or Firm—Aditya Krishnan

(57) ABSTRACT

An apparatus and method for degaussing a cathode ray tube including an alternating current (AC) source; a positive temperature coefficient (PTC) element; a resistance; a first switch coupled between said AC source and said PTC element in turn coupled to the resistance switching between a first position and a second position; a second switch coupled between the AC source and the PTC element switching between a first position and a second position; wherein in 110 volt operation, the first switch switched in a first position and the second switch switched in a second position; and conversely in 220 volt operation, the first switch switched in a second position and the second switch switched in a first position. Further, a first resistance is connected in series with a second resistance wherein both the first and second resistence being approximately the same ohmic values wherein the resistance balancing current flow in the 110 volt operation and the 220 volt operation so as the current flow across the PTC element in both modes of operation being substantially equal, including a source of alternating voltage potential; a first and second switch means coupled to said source; a single positive temperature coefficient PTC thermistor device coupled to said first and second switch means; and a degaussing coil coupled to the PTC thermistor device wherein a degaussing current flowing through said PTC thermistor device equal to the current flow through the degaussing coil.

29 Claims, 3 Drawing Sheets

DEGAUSSING CIRCUIT

BACKGROUND

1. Field of the Invention

This invention relates to a degaussing circuit of the type commonly used in cathode ray tubes (CRT's), color televisions, color monitors and other like type devices. More particularly, this invention relates to an improved degaussing circuit having a degaussing coil and a single thermistor element with a positive temperature coefficient (PTC) or mono-PTC unit for dual voltage applications.

2. Background of the Invention

Rasters in all cathode-ray tubes (CRTs) are created by the horizontal and vertical sweeping movement of three electron beams. The electron beams emitted by red, green, blue (R,G,B) cathodes are controlled by deflection circuits whose magnetic fields are orthogonal to the direction of the electron beams.

The system of magnetic control, which enables tracing of the raster, has drawbacks because the electron beams are susceptible to changes because of earth and stray magnetic fields, which give off interfering beams. Also, terrestrial flux can reach 0.05 mT (0.5 Gs) in the absence of nearby magnetic structures, with a maximum of 0.2 mT (2 Gs) in the vicinity of steel-frame buildings or underground iron, nickel or cobalt ore deposits. Even more dense magnetic fields can be produced by interfering sources, such as unshielded loudspeakers, motors, and transformers located in direct proximity of the CRT. These kinds of interferences result in tainted, or, in more extreme instances, a complete loss of purity of the primary colors in the CRT. In order to maintain proper pixel excitation by the designated electron beams, various demagnetizing circuits have been utilized in all but the smallest picture tubes. A network that employs these thermistor devices, having positive thermal coefficient (also known asa posistor, or PTC) are connected in series with degaussing coils have been around for a number of years, and are still one of the more commonly used circuits for degaussing applications. However, these circuits that utilize PTC thermistors demonstrate poorly defined characteristics because the PTC thermistors are susceptible to variations in line voltage, load current, and thermal drift. The degaussing circuits produce considerable in-rush current, which in turn create strong electromagnetic fields on their own that are often able to disturb adjacent sensitive electronic equipment.

The basic operational principles of the PTC thermistor circuit are well understood, i.e., upon power-up, a large-magnitude, alternating inrush current generates a magnetic field, whose amplitude, during duration of the first few AC cycles, far exceeds the level of the surrounding stray magnetic fields. Then, the current and its associated flux are gradually reduced to almost nill and the process is terminated. The purpose of this procedure is to cycle through B—H magnetic hysteresis loop of the aperture grill/shadow mask and other ferrous alloy materials of the CRT so that the alternating orientation and diminishing magnitude of the magnetic field vectors reduce remnant flux to the negligible value.

The Trinitrons, having their phosphorous pixels fashioned in a form of vertically elongated strip are more susceptible to vertically oriented parasitic magnetic vectors than to horizontal ones. This is because vertical flux causes horizontal deviation of electron beams. For the same magnitude of horizontally and vertically oriented flux, the latter produces more noticeable color impurities. Thus, to minimize horizontal landing offset, predominantly vertical oriented compensating fields should be generated by the degaussing coils. This dictates horizontal placement of the coils directly above and below the CRT. In practice, since mutual orientation of the television set and the terrestrial magnetic field can vary widely depending on TV spatial positioning and its geographical location, the degaussing coils are mounted at the back of the CRT cone, producing magnetic field vectors angled in reference to the aperture grill. Such orientation of the degaussing coils also boost eddy currents induced in the magnetic shields that cover the back conical side of the CRT.

Further, calculations of magnetic flux produced by the degaussing coils are complicated because of the complex, three-dimensional geometrical form of the coils and their spatial orientation in reference to the CRT. Equations presented below illustrate simplified magnetic relations and, consequently, approximated results.

A vector relations of the scalar functions are represented by the following equations: A typical 67-turn degaussing coil that conducts the inrush current of 15 $A_{pk}$ produces magnetomotive force $$MMF=I^* N=15 A_{pk}*67 \text{ trn}=1,005 A_{pk}\text{trn}$$

For a 32-inch CRT, each of the two quasi-rectangular degaussing coils is about 0.76 m wide and 0.28 m high.

Corresponding magnetic field intensity ($H_0$) in geometrical center of the coil can be derived from the Biot-Savart's law $\delta H=I^*\delta L^*\sin(r,dL)/4\pi r^2$ and converted to accommodate the rectangle-shaped inductor $$H_0=2IN[x^{-2}+y^{-2}]^{1/2}p^{-1}=2*1,005 A_{pk}\text{trn}*[(0.76 \text{ m})^{-2}+(0.28 \text{ m})^{-2}]^{1/2}*p^{-1}=2,435 A_{pk}\text{trn/m}$$

The magnitude of this field decreases in reversed proportion to the axial distance $1=0.25$ m measured in direction normal to the plane of the coil, from its center to the aperture grill plane. Based on the same law, we have $$H=\{IN/2p[(0.5x)^2+(0.5y)^2+1^2]^{1/2}\}*\{x/[(0.5y)^2+1^2]^{1/2}+y/[(0.5x)^2+1^2]^{1/2}\}$$

$$H=\{1,005 \text{ Atrn}/2p[(0.38 \text{ m})^2+(0.14 \text{ m})^2+(0.25 \text{ m})^2]^{1/2}\}*\{0.76 \text{ m}/[(0.14 \text{ m})^2+(0.25 \text{ m})^2]^{1/2}+0.28 \text{ m}/[(0.38 \text{ m})^2+(0.25 \text{ m}^2]^{1/2}\}>>1,100 A_{pk}\text{trn/m}$$

Vector H constitutes a geometric composite of its horizontal and vertical fractions. The vertical element of that vector is reduced by the angled orientation of the coil that rests on the back side of the CRT. For the CRT having a deflection angle of $a=110$ deg, the inclination angle of the degaussing coil is approximately $b=45$ deg, thus $$H_y=\cos b^*H=\cos 45 \text{ deg}*1,100 A_{pk}\text{trn/m}=776 A_{pk}\text{trn/m}$$

Finally, the vertical fraction of flux induced by the single coil can be found $$B_y=m_0 m_r H_y=4p\text{Exp}(-7)H/m^*1^*776 A_{pk}\text{trn/m}>>1 \text{ mT (10 Gs)}$$

In spite of apparent simplicity of the demagnetization process, there are several challenging issues. The auto-volt or wide-range AC operation requires automatic adaptation of the degaussing circuit to the line voltage that may span from 88 to 288 volts (proportion in excess of 1:3). Since voltage regulation of the demagnetizing circuits is impractical, the only viable alternatives are switched PTC thermistors and/or current-limiting resistors. Networks based on switched PTC thermistors and/or resistor components reduce the current ratio to 1:1.7 for line voltage variations of (88–153)V or (176–288)V. Larger CRTs require stronger magnetic fields to maintain same flux density (number of magnetic lines per unit area) of the screen. For instance, a CRT enlarged from 27-inch to 36-inch CRT almost doubles its raster area.

Magnetic flux has to be increased in the same proportion if the flux density is to remain unchanged. This can be accomplished only by increasing current flowing through the coil, the number of turns, or combination a of both. In either case, cost escalates steeply as increased current requires larger diameter wire, while increased number of turns command more length of wire.

For the former option (current), there are limitations of maximum current output from the residential AC outlet. Excessive surge whose I-t product exceeds that of the household circuit breaker poses risk of its activation. Large-magnitude current surges also induce undesirable voltage sags that may lead to malfunction of the associated entertainment system or sensitive computer hardware/software gear.

The latter alternative (number of turns) offers diminishing return on investment because coils having a larger number of turns exhibit increased impedance (both their resistive and reactive parts) that reduces current.

The third possible solution, combined simultaneous boost of current and turn numbers provide a proportional mix of advantages and limitations of these two methods.

By way of example, a CRT's shadow mask can become magnetized by the earths magnetic field or by an electromagnetic field generated by the operation of neighboring devices or other electrical apparatus. Upon the shadow mask of the CRT being permanently magnetized, localized magnetic fields, which are produced, can effect the path of the CRT's electro-beams and hence the overall picture quality is deteriorated. In addition, the color purity of the video image displayed by the CRT can be noticeably deteriorated. Color TV's, computer monitors and the like include an automatic degaussing circuit in order to compensate for the presence of ambient magnetic fields. Such degaussing circuits are used with the CRT to be degaussed each time the power is supplied to the video display. A typical automatic degaussing circuit produces an ordinary demagnetizing field which decays in correspondence to an alternating decay current. One implementation of such a circuit may comprise a temperature sensitive device, for example, a positive temperature coefficient (PTC) thermistor connected in series between a dedicated degaussing relay and a degaussing coil. The degaussing relay is switched ON upon powering up of the CRT apparatus and the act of degaussing is completed within a few seconds after the power ON switch is turned on usually 1 to 2 seconds after the relay has been initialized.

SUMMARY OF THE INVENTION

It is an object of the present invention to provide a compact degaussing circuit that does not require a large positive temperature coefficient (PTC) element but can still demagnetize the desired circuit completely.

In one embodiment of the present invention there is a system for degaussing a cathode ray tube including an alternating current (AC) source; PTC element; a resistance; a first switch coupled between said AC source and said PTC element, which in turn is coupled to the resistance switching between a first position and a second position; a second switch coupled between the AC source and the PTC element switching between a first position and a second position; wherein in 110 volt operation, the first switch switched in a first position and the second switch switched in a second position; and conversely in 220 volt operation, the first switch switched in a second position and the second switch switched in a first position. Further, a first resistance is connected in series with a second resistance wherein both the first and second resistence being approximately of the same ohmic value wherein the resistance balancing current flow in the 110 volt operation and the 220 volt operation so as the current flow across the PTC element in both modes of operation being substantially equal.

In another embodiment of the present invention there is a degaussing circuit for a cathode ray tube including a source of alternating voltage potential; a first and second switch device coupled to the source; a single PTC element device coupled to the first and second switch devices; and a degaussing coil coupled to the PTC element device wherein a degaussing current flowing through the PTC element device equal to the current flow through the degaussing coil.

In still another embodiment of the present invention there is a degaussing system including a PTC element including a first leg and a second leg; a first coil connected to the first leg of the PTC element device; a second coil connected to the second leg of the PTC element device, wherein the current flow through the first coil and second coil being optimized such that the coil number being twice the usual number and the cross-sectional area being halved.

Yet still, in another embodiment the present invention, there is a degaussing circuit for an electronic device, including an alternating voltage potential; a driver device; a positive temperature coefficient (PTC) element device controlled by the driver device receiving current from said alternating voltage potential and connected to a degaussing device so that a degaussing current across the PTC element device is approximately the same as the degaussing current received by the degaussing device wherein said driver means operates in a first mode receiving 110 volts from the alternating voltage potential and in a second mode receiving 220 volts from the alternating voltage potential.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example and not intended to limit the present invention solely thereto, will best be understood in conjunction with the accompanying drawings in which.

DETAILED DESCRIPTION OF THE INVENTION

While the present invention has been particularly shown and described with reference to a preferred embodiment(s), it will be understood that various changes and modifications may be made without departing from the spirit and scope of this invention. It is intended that the appended claims be interpreted to cover the embodiments described herein and all equivalents thereto.

Figure 1:
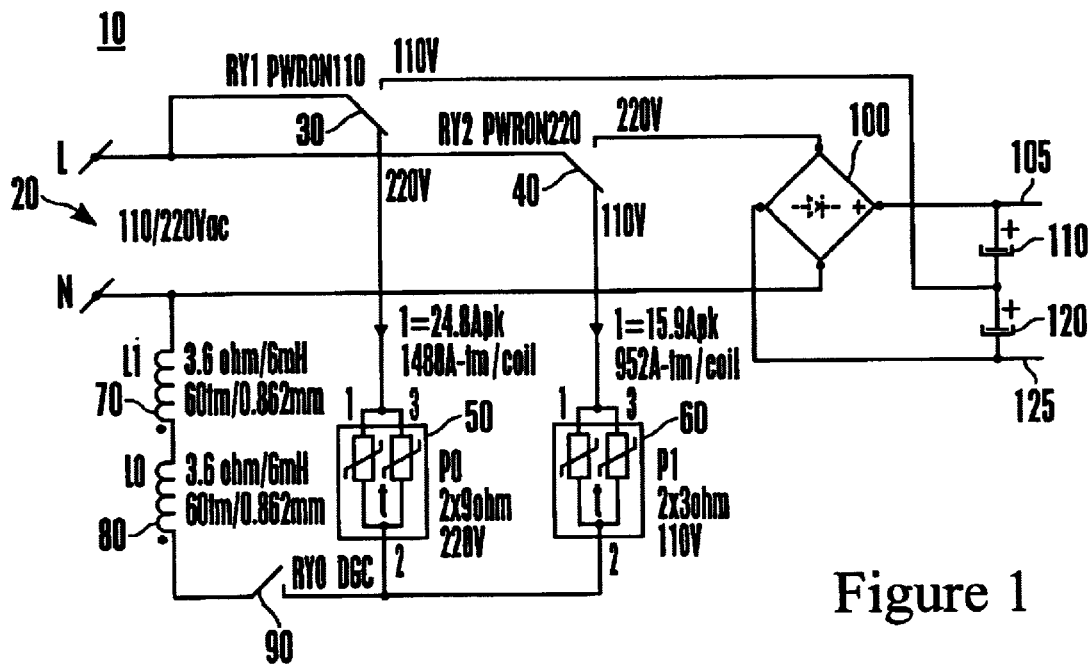
FIG. 1 is a circuit diagram of a related degaussing method.

FIG. 1 is a circuit diagram of a related degaussing circuit 10 which includes a power source part 20 generating a frequency in the vicinity of 50 to 60 Hz, the power source, in part, includes relay switch 30 and relay switch 40 connecting with the power source 20. A rectifying circuit 100 generating a DC output connected to relay switch 40, the rectifying circuit, which may comprise a diode is coupled to a smoothing circuit containing capacitors 110 and 120 with output terminals 105 and 125. The degaussing circuit 10 includes PTC elements 50, 60 which are arranged in either/or parallel and connected to relay switches 30 and 40.

Upon actuation of either relay switch 30, 40, a current is generated across either of the PTC elements. Further, each PTC element is in turn connected to a degaussing switch 90. Upon actuation of the degaussing switch 90 a degaussing current is generated about both degaussing coils 80, 70. When receiving a 110 volt input at AC source 20, the relay switch 40 is switched so as to generate a current of approximately 15.9 $A_{pk}$ across the PTC element 60. Further, this PTC element has 952 A-trn/coil and has 2×3 ohm resistance per element. Subsequently, upon actuation of the degaussing switch 90, a degaussing current is generated across coils 70 and 80. Each of the degaussing coils has approximately 60 trns and a cross-sectional area of 0.862 mm. Next, when receiving a 220 volt input AC at source 20, the relay switch 30 is switched on so as to generate a current of approximately 24.8 $A_{pk}$ across PTC element 50. The PTC elements contains elements of 2×9 ohms and are approximately 1488 trn/coil. Upon actuation of the degaussing switch 90 a resultant degaussing current of approximately 24.8 $A_{pk}$ is generated across coil 70, Further, there is provided a driver circuit (not shown) for supplying high and low voltage signals for switching relay switches 30, 40 in the ON position and in the OFF position.

Typically, such a driver circuit (not shown) may include a transistor, switching connected between a power source voltage terminal and a ground potential. The high and low voltage signals may be applied to the base terminal of a transistor through a resistor which serves switching relays 30, 40 ON and OFF .

As illustrated above, the related circuit diagram of FIG. 1 is a continuation of the circuit design of fixed circuits, with a difference being a dual thermistor element with a positive temperature coefficient for its resistance, or as it also known, a dual disk posistor connected electronically and coupled as a family in parallel putting an increased current and an increased magnetic field intensity during the degaussing of the CRT or the like device.

However, the aforementioned degaussing circuit exhibits large undesired residuals and a disproportionate failure of the cathodes in both the 110 volt and 220 volt operating modes. This is because, as has been explained in the 110 volt operation, the current is about 16 $amp_{pk}$ for 110 volt operation versus about 25 $amp_{pk}$ for 220 volt operation. For example, a large in rush kind can overload PTC thermistors in the dual mode operation (as generally a maximum 15 $A_{pk}$ is recommended), and as such, this greater than maximum current amperage produces a fast decaying curve of current envelope. At 288 volts, this is sufficiently high to prevent a proper completed degaussing process because the difference between prior and consecutive current cycles can reach several amperes. For example, reaching 288 volts during degaussing can often result in abrupt step like reductions in the current which may degrade the effectiveness of the demagnetization. In other words, such step like current reductions can cause an adverse effect to the degaussing process resulting in increased magnetization.

Also, excess current surges can trip conventional 6 amp circuit breakers operating in most households that are being powered by 220 volt networks or the current surges can gradually wear down wall mounted fuses causing a degradation. This kind of adverse effect is especially more pronounced when other appliances are used which exhibit an additional heavy load on the circuit breaker or similar network.

Finally, large excursions of current as a result of the above abrupt step like current reductions, can additionally cause other kinds of electrical disturbances, such as voltage sag and electromagnetic interferences (EMI).

Figure 2:
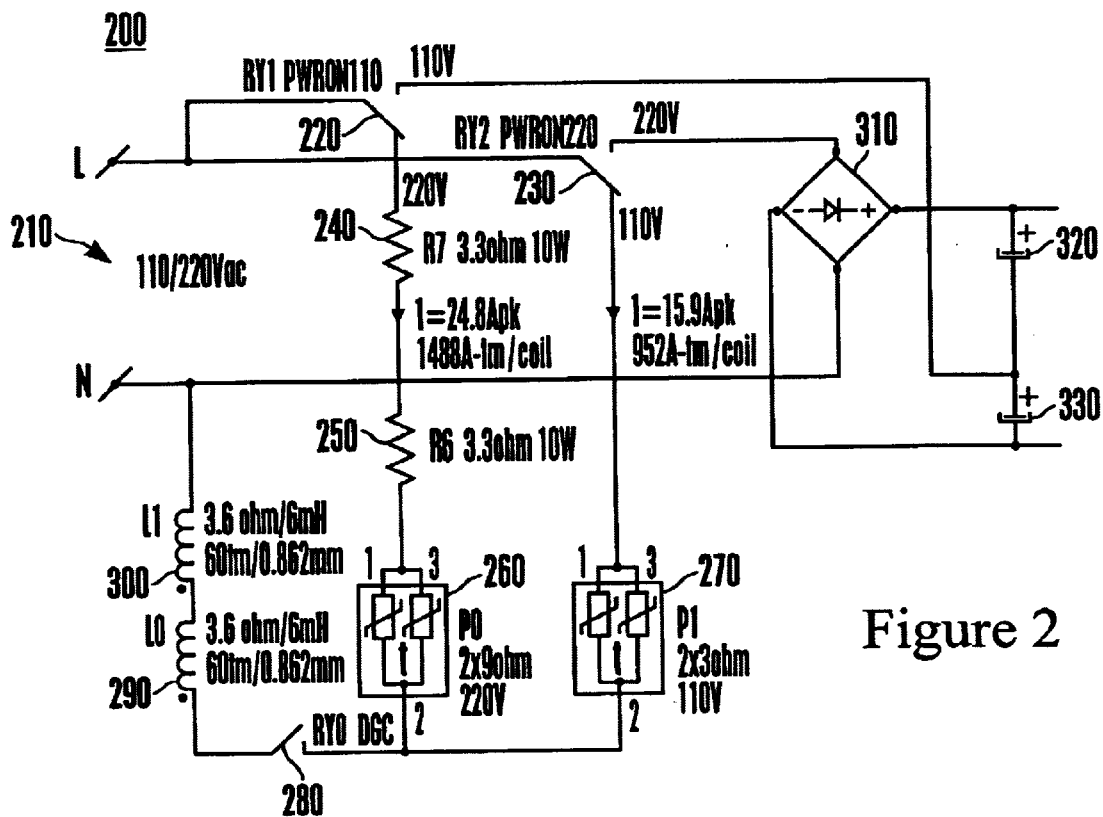
FIG. 2 is another circuit diagram of a related degaussing method.

FIG. 2 is circuit diagram of a related degaussing circuit in which a color cathode ray tube CRT or similar device requires periodic degaussing in order to offset the effects of ambient magnetic fields that may have occurred on the CRT's metallic components. FIG. 2. illustrates a degaussing circuit 200 in which a power source 210 receives either 100 volts or 220 volts of alternating current. The degaussing circuit 200 of FIG. 2 incorporates substantially the same components of the degaussing circuit 10 of FIG. 1, which include rely switches 220, 230, rectifying circuit 310, PTC elements 260, 270, degaussing switch 280, degaussing coils 290, 300 and smoothing capacitors 320, 330.

Additionally the degaussing circuit of FIG. 2 has inserted between the output of the AC source 210 and the PTC element 260, resistors 240, 250 which are serially connected from the relay switch 220 to the PTC element 260. Therefore, upon actuation of the relay switch 220, a current of approximately 16.5 $A_{pk}$ at the midpoint of the resistors 240, 250 is outputted. Hence, the degaussing circuit of FIG. 2. (i.e. modified degaussing circuit of FIG. 1) when receiving an AC input of 220 volts, the current across PTC element 260 is reduced from 24.8 $A_{pk}$ (See FIG. 1) to 16.8 $A_{pk}$ shown in FIG. 2. While the additional component costs of the degaussing circuit of FIG. 2 have been increased, the overall operational reliability of the circuit has been improved relative to uniform and safety when receiving either 110 volts or 220 volts.

Therefore, as explained herein, if the amplitude differential between the peak amplitude in one period of the alternating current, and that of the next period is too large the CRT not only fails to be demagnetized but an unevenness in color may be generated on the screen.

Attempts have be made to prevent this such an occurrence by using a larger PTC element so as to reduce the magnitude of the current differential, however, in so doing the degaussing circuit cannot be so easily be miniaturized and the portion of the CRT which incorporates the degaussing circuit cannot be made compact.

Figure 3:
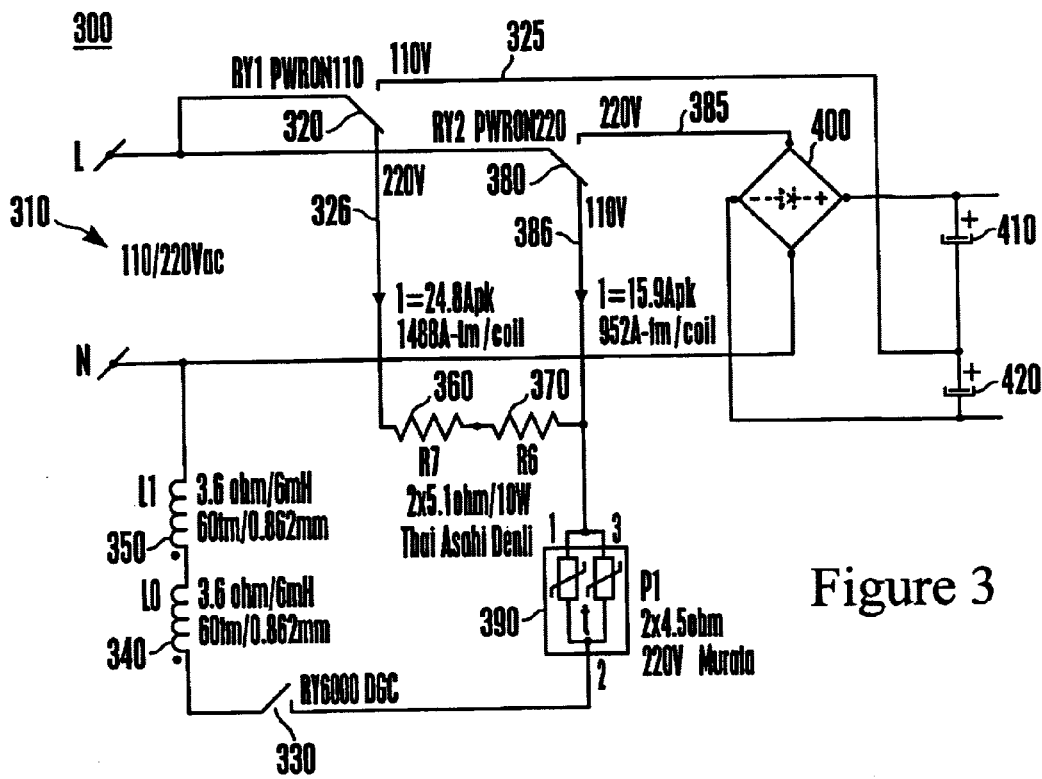
FIG. 3 is a circuit diagram of a degaussing method in accordance with the present invention.

FIG. 3 discloses a detailed description of the degaussing circuit 300 of the present invention which includes AC source 310 connected to relay switches 320, 380 which control current to the PTC element 390. A rectifying circuit 400 connected to relay switch 380 and its DC output is connected to a smoothing circuit of capacitors 410, 420. The degaussing circuit 300 eliminates the use of dual PTC elements and in place thereof has only a mono or single PTC element 390. Upon actuation of either of the relay switches 320 or 380 a current is generated across the PTC element 390. When receiving 110 volts at the AC source 310 the relay switch 320 is switched to connect to lead 325 and relay switch 380 is switched to connect to lead 386. The current measured across the PTC element 390 is approximately 14.8 $A_{pk}$. Further this PTC element has 891 A-trn/coil and 2×4.5 ohm resistence. Subsequently, upon actuation of the degaussing switch 330, a degaussing current is generated across coils 340 and 350. Each of the degaussing coils is approximately 60 trn and has a cross-sectional area of 0.862.

Next, when receiving a 220 volt input AC at the source 310, the relay switch 320 is switched to lead 326 and relay switch 380 is switched to lead 385 so as to generate a current of approximately 15.4 $A_{pk}$. The resistence 360 and 370 serve to balance the current so that the current measured in 220 volt operation of 15.4 $A_{pk}$ and the current measured in 110 volt operation are not substantially different. In this particular case the difference is approximately 15.4 $A_{pk}$−14.8 $A_{pk}$=0.6 $A_{pk}$. For balancing the resistor values have been increased to 10.2 ohms for the combination of resistor 360, 370 or, in this particular instance, using two 5.1 ohm/10 w Thai Asahi Denki resistors.

With the elimination of the additional PTC elements of a dual PTC element device, the circuit of the present invention still performs equally well as the related art circuits of FIGS. 1 and 2 (which both include two PTC elements) at a significantly reduced cost. Moreover, the 110 volt diagram circuit configuration remains essentially unchanged, while the 220 volt circuit configuration is now using the same PTC element 390 that has been used in the 110 configuration. In order to balance both currents in both modes, a series resistance 360 and 370 have been increased from 6.6 ohms to 10.2 ohms.

Further, as more current flows through, the current through the PTC element it stays at a steady state while the operating temperature is increased. Inside the degaussing circuit, the alternating current supplied thereto is attenuated, and an alternating decay current is generated by the degaussing coil 350, 340 and serves to demagnetize the cathode ray tube of the monitor. After the degaussing is completed, the operation of the power source 310 is stopped or the degaussing switch opened, so as to stop the supply of current. The degaussing current across the resistors 360, 370 actuating time across the PTC element 390 is performed in a non-linear fashion, so as to prevent high in-rush currents to the other elements of the circuit.

Figure 4:
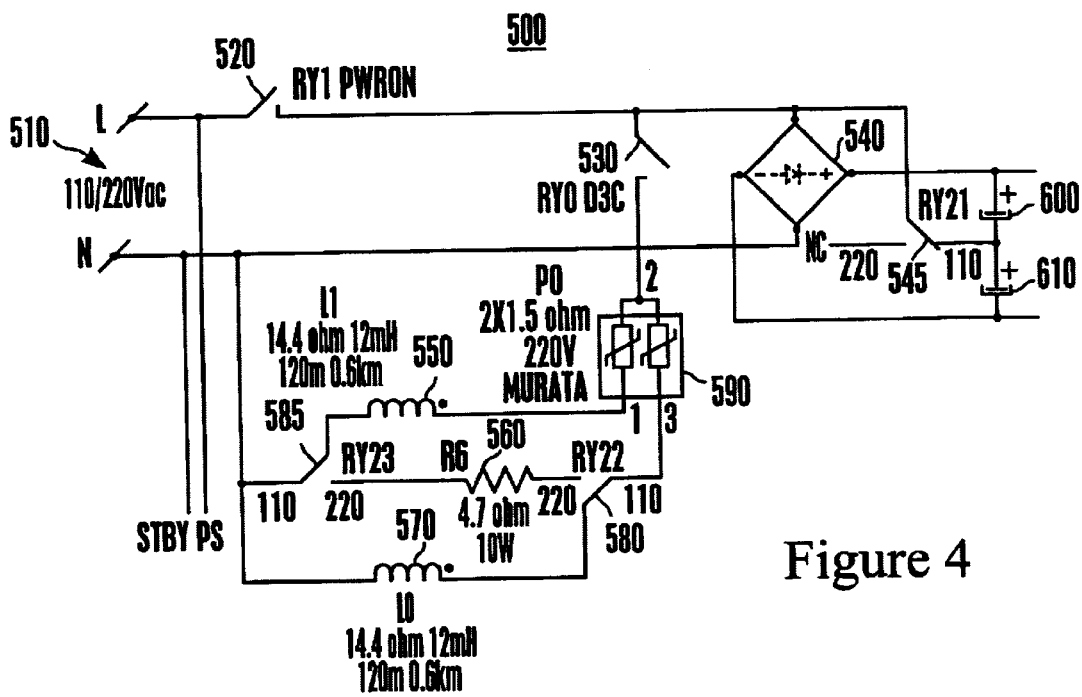
FIG. 4 is another circuit diagram of the degaussing method in accordance with the present invention.

FIG. 4 is another embodiment of the present invention showing degaussing circuit 500 having an AC source 510, a power relay 520 connected to the AC source for powering up the entire circuit. A relay switch 530 for controlling operation of the PTC element 590. A rectifier circuit 540 connected to the AC source 510 via the power on relay 520 and an additional relay switch 545 connected to an input lead of the AC source switching between a 110 volt and 220 volt connection. As indicated therein, FIG. 4 differs from FIG. 3 in that the degaussing coils 550 and 570 are parallely arranged with an impedance 560 placed there between. Each of the coils 530 and 560 is of 14.4 ohms/12 mH and 120 trns with a cross-sectional area of 0.61 mm. Further, each of the coils is coupled to each leg of the PTC element 590. Smoothing capacitors 600, 610 serve to smooth the rectified output signal.

The degaussing procedure starts upon actuation of each of the switches 530, 545 when the power on relay 520 is turned ON, a degaussing current is supplied to the PTC element 590 in a non-linear fashion whereby the output current is then supplied to each of the coils so as to demagnetize the CRT. Further, relay switches 580, 585 serve to toggle between 110 volt operation and 220 volt operation whereby in 220 volt operation the switches are toggled to connect both end of resistor 560. This enables the resistor 560 (of approximately 4.7 ohms) to be in the circuit and serves to better balance any in-rush current or correct for too high a current difference in both modes of operation. When in 110 volt operation the relay switches 585 and 580 are toggled to connect to an output of coil 550 and an output of PTC element 590. Therefore, in this circuit arrangement no current flows through the resistor 560 as current limiting in 110 mode operation is not needed.

Figure 5A:
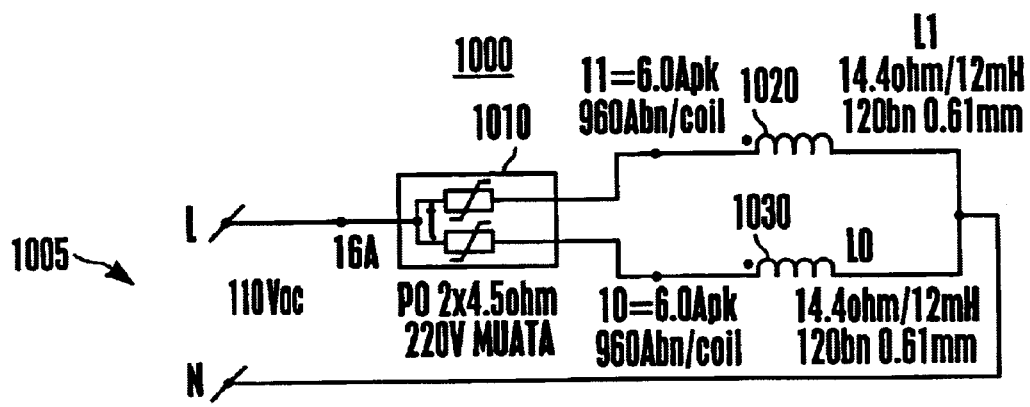
FIGS. 5A and 5B are circuit diagrams of a first and second implementation of the degaussing method in accordance with the present invention.

FIGS. 5a. and 5b show a degaussing circuit 1000 in a 110 volt configuration and degaussing circuit 1100 in a 220 volt configuration. In a computer monitor or other portable type dual voltage monitor, there can be found a switch to change the input voltage from 110 to 220 volts and if not little change in the overall configuration of the degaussing circuit is necessary to accommodate the 110 volt or 220 volt operation. However, the process for degaussing circuits is much different. It is often necessary to reconfigure demagnetizing circuits (degaussing circuits). This can be often too costly and the in-rush currents are not sufficiently large enough to necessitate remedial changes. Engineer's used to design a degaussing circuit that guaranteed desired magnetic flux conditions and completely disregarded excess current and maximum voltage. In order to overcome these requirements, efforts are made to approximate identical magnitudes of magnetic fields in both line voltages yielded thus far. Moreover, similar magnetic fields in both 110 and 220 volts were also accomplished by appropriate adjustment of the total impedance of the degaussing circuit.

Figure 5B:
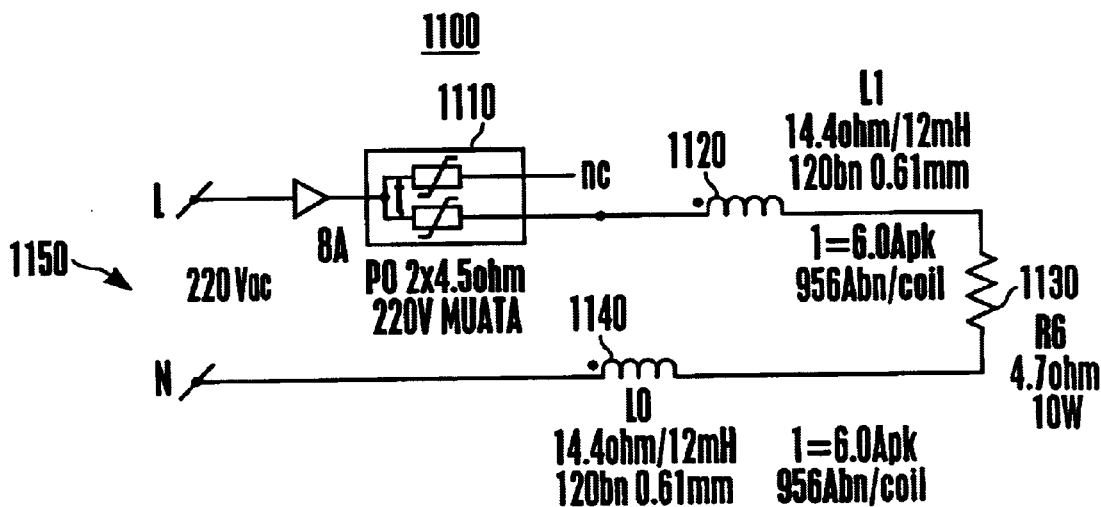

In FIGS. 5a and 5b, the degaussing circuits 1000 and 1100 utilize coil impedance as a dominant way of controlling the current in both line voltage modes. To optimize operation, the coils have been rewound, their turn number doubled while their cross-sectional halved. These changes have increased inductance by two times and resistance by four times, while preserving volume, weight, and price of the copper. The circuit is switched from parallel connection of a 110 volt mode to a series connection in the 220 volt mode (FIG. 5b). Currents flowing through each of the coils remain essentially unchanged and so do the magnetic fields, however, total current in 220 volt mode is only half that of the 110 volt configuration.

FIG. 5a shows a 110 volt mode configuration of the degaussing circuit 1000. Therein FIG. 5a., PTC element 1010 is coupled to coil 1020 and coil 1030. As indicated in FIG. 5a the number of windings/cross-sectional area of coil 1020 is 120 trns/61 mm with a resistance of 14.4 ohm/12 mH and having a measured current of I=8.0, 960 A-trn/coil turns. Also, the coil 1030 of FIG. 5a the number of windings and cross-sectional area of the coil is 120 trns/61 mm, a resistance of 14.4 ohm/12 mH and having a measured current of I=8.0, 960 A-trn/coil turns.

FIG. 5b shows a different configuration for 220 volt operation. Here a first leg of the PTC element 1110 is not connected. While the second leg of the PTC element 1110 is coupled to a first coil 1120 of 120 trns/0.61 mm cross-sectional area and a resistance of 14.4 ohm/12 mH, a resistor 1130 (4.7 ohm 10 w), which in turn is serially coupled to another coil 1140 of 120 trns/0.61 mm cross-sectional area and a resistance of 14.4 ohm/12 mH. The measured current across each of the coils 1120 and 1140 is substantially the same as I=8.0 $A_{pk}$ 966 A-trn/coil. The PTC element is the same as the PTC element of FIG. 5a of 2×4.5 ohm/220/Murata.

As indicated, the halved current in the 220 volt configuration has a substantial savings per unit. Also there is much less audible thumping noise due to the reduced current for each coil. Table 1 below demonstrates calculated values of the current and the amp-turn product of each of the configurations.

TABLE 1

|  | FIG. 2 | | FIG. 3 | | FIG. 4 | | FIGS. 5a, 5b | |
| --- | --- | --- | --- | --- | --- | --- | --- | --- |
|  | 110 V | 220 V | 110 V | 220 V | 110 V | 220 V | 110 V | 220 V |
| Max. Current [$A_{pk}$] | 15.9 | 24.8 | 15.9 | 16.5 | 14.8 | 15.4 | 8.0 | 8.0 |
| IN [$A_{pk}$trn] | 952 | 1,488 | 952 | 990 | 891 | 926 | 960 | 956 |

The present invention provides degaussing circuits having a single PTC element design which can be exposed to high in-rush currents where the PTC elements has high ohmic values to enable a sufficient degaussing current to be sent to degaussing coils to demagnetize a shadow masks or the like of cathode ray tube devices.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as they fall within the scope of the appended claims.

What is claimed is:

1. A system for degaussing a cathode ray tube comprising:
   an alternating current (AC) source;
   a positive temperature coefficient (PTC) thermistor;
   a resistance;
   a first switch coupled between said AC source and said PTC thermistor in turn coupled to said resistance switching between a first position and a second position;
   a second switch coupled between said AC source and said PTC thermistor switching between a first position and a second position;
   wherein in 110 volt operation, the first switch switched in a first position and the second switch switched in a second position; and conversely in 220 volt operation, the first switch switched in a second position and the second switch switched in a first position.

2. The system according to claim 1, wherein said resistance comprising a first resistance in series with a second resistance wherein both the first and second resistances being approximately the same ohmic values wherein said resistance balancing current flow in the 110 volt operation and the 220 volt operation so as the current flow across the PTC thermistor being substantially equal in both the 110 volt operation and the 220 volt operation.

3. The apparatus according to claim 1, further comprising:
   a degaussing coil coupled to said PTC thermistor such that upon actuation of the switches in either the 110 volt operation or the 220 volt operation, said degaussing coil generating a demagnetizing flux for a predetermined period of time.

4. The apparatus according to claim 3, wherein said degaussing coil comprising a first coil and a second coil in series connection with one end of said first coil being coupled to said PTC thermistor and the other end of said second coil being coupled to an output terminal of said AC source.

5. A degaussing circuit for a cathode ray tube, comprising:
   a source of alternating voltage potential;
   a first and second switch means coupled to said source;
   a single positive temperature coefficient (PTC) thermistor device coupled to said first and second switch means;
   at least one degaussing coil coupled to the PTC thermistor device wherein a degaussing current flowing through said PTC thermistor device is equal to the current flow through the degaussing coil, the degaussing coil including at least a first and second coil having substantially the same sizes as each other.

6. The degaussing circuit of claim 5, wherein said degaussing circuit does not generate a significant residual magnetization.

7. The degaussing circuit of claim 1, wherein said source of alternating potential being either 110 volts or 220 volts.

8. The degaussing circuit of claim 7, wherein when receiving 110 volts of alternating potential or receiving 220 volts of alternating potential the current flowing through both said single PTC thermistor and said degaussing coil being sufficient to demagnetize a cathode ray tube device.

9. The degaussing circuit of claim 5, wherein a single PTC thermistor being used in a 110 volt mode of operation and a 220 volt mode of operation.

10. A degaussing system comprising:
    a positive temperature coefficient (PTC) thermistor comprising a first leg and a second leg;
    a first coil connected to the first leg of the thermistor device, the first coil in a first configuration defining a first number of turns and a first cross-sectional area;
    a second coil connected to the second leg of the thermistor device, the second coil in a first configuration defining a second number of turns and a second cross-sectional area, the first and second numbers of turns and first and second cross-sectional areas not being constrained to be different from each other;
    wherein the current flow through the first coil and second coil is optimized by reconfiguring at least one coil into a second configuration characterized by a reconfigured number of turns that is at least twice the first or second number of turns and/or characterized by a cross-sectional area that is at least half the first or second cross-sectional area.

11. The degaussing system of claim 10, wherein the end of the first coil and the end of the second coil are connected.

12. A degaussing system, comprising:
    a positive temperature coefficient (PTC) thermistor device comprising a first leg and a second leg;
    said first leg of said PTC thermistor device being non connected;
    said second leg of said PTC thermistor device being coupled to a degaussing device, said degaussing device comprising at least a first coil arrangement and a second coil arrangement with an impedance therebetween.

13. The degaussing system of claim 12, wherein the first coil arrangement in a first configuration defines a first number of turns and a first cross-sectional area and the second coil in a first configuration defines a second number of turns and a second cross-sectional area, with the first and second numbers of turns and first and second cross-sectional areas not being constrained to be different from each other, and wherein both of: the first coil arrangement, and second coil arrangement, are configured in a second configuration having double the first or second number of turns while having half the first or second cross-sectional area.

14. The degaussing system of claim 13, wherein the second configuration renders approximately a doubling of inductance rendered by the first configuration and a quadrupling of resistance rendered by the first configuration.

15. The degaussing system of claim 13, wherein a weight of said first coil arrangement and a weight of the said second coil arrangement when in the second configuration are approximately no different than the weights of the coil arrangements when in the first configuration.

16. A degaussing method for a cathode ray tube, comprising:
    receiving a source of alternating voltage potential, the source supplying, at respective times, 110 volts and 220 volts;
    coupling first and second switch means to said source of alternating potential;

coupling a single positive temperature coefficient (PTC) thermistor device to said first and second switch means; and enabling a degaussing coil coupled to the PTC thermistor device upon actuation of said first and second switch means to have a degaussing current flowing through said PTC thermistor device to be substantially equal to the current flow through the degaussing coil.

17. The degaussing method of claim 16, wherein said degaussing circuit does not generate a significant residual magnetization.

18. The degaussing method of claim 16, wherein when receiving 110 volts of alternating potential or receiving 220 volts of alternating potential the current flowing through both said single PTC thermistor device and said degaussing coil is substantially the same and sufficient to demagnetize a cathode ray tube.

19. The degaussing method of claim 18, wherein a single PTC thermistor being used in a 110 volt mode of operation and a 220 volt mode of operation.

20. A degaussing circuit for a cathode ray tube, comprising:

a means for receiving an alternating voltage potential;

first and second switch means coupled to said source;

a single positive temperature coefficient (PTC) thermistor means coupled to said first and second switch means; and a degaussing means coupled to the PTC thermistor means wherein a degaussing current flowing through said PTC thermistor means is substantially equal to the current flow through the degaussing means, the degaussing means including at least a first degaussing coil coupled to a second degaussing coil.

21. The degaussing circuit of claim 20, wherein said means for receiving an alternating current receiving either a 110 volts source or a 220 volt source.

22. The degaussing circuit of claim 20, wherein said first switch means and said second switch means being in a first configuration when receiving an alternating potential of 110 volts and being in a second configuration when receiving an alternating potential of 220 volts.

23. A degaussing circuit for an electronic device, comprising:

at least one voltage source;

at least one driver means electrically connected to the voltage source;

at least one positive temperature coefficient (PTC) thermistor device controlled by the driver means and connected to a degaussing device so that a degaussing current flowing across the thermistor device is approximately the same as a current received by the degaussing device, wherein the driver means operates in a first mode receiving 110 volts from the voltage source and in a second mode receiving 220 volts from the voltage source, wherein said degaussing device when operating in the first mode comprises a first coil coupled to a first leg of said thermistor device and a second coil coupled to a second leg of said thermistor device and when operating in the second mode comprises a first coil serially coupled to a second coil coupled to said first leg of said thermistor device, said second leg of said thermistor device being not coupled.

24. The degaussing circuit of claim 23, further comprising:

a resistance inserted between said first coil and said second coil when said degaussing device operating in a first mode so as to balance the degaussing current between the first mode and the second mode.

25. The degaussing circuit of claim 24, wherein said driver means comprising a first switch serially connected to a second switch with a resistance there between.

26. The degaussing circuit of claim 25, wherein when operating in a first mode said first switch connecting said first leg of said thermistor device and said second switch connecting said second leg of said thermistor device and when operating in said second mode said first switch connecting said first leg of said thermistor device and said second switch connecting an output of the first switch connection.

27. The degaussing circuit of claim 26, wherein in said second mode said second switch not connecting said second leg of said thermistor device.

28. The degaussing circuit of claim 23, wherein said first coil being approximately the same value as said second coil.

29. The degaussing circuit of claim 23, wherein said first coil being approximately double the number of turns of a common coil and half the cross-sectional area exhibiting twice the common inductance.

* * * * *